(12) United States Patent  
Esary et al.

(10) Patent No.: US 8,458,060 B2  
(45) Date of Patent: Jun. 4, 2013

(54) SYSTEM AND METHOD FOR ORGANIZING PRICE MODELING DATA USING HIERARCHICALLY ORGANIZED PORTFOLIOS

(75) Inventors: Niel Esary, Mountain View, CA (US);  
James L. Keesey, Sunnyvale, CA (US);  
Ian Tidswell, San Francisco, CA (US)

(73) Assignee: Vendavo, Inc., Mountain View, CA (US)

(*) Notice: Subject to any disclaimer, the term of this patent is extended or adjusted under 35 U.S.C. 154(b) by 1008 days.

(21) Appl. No.: 10/857,262

(22) Filed: May 28, 2004

(65) Prior Publication Data

US 2005/0267831 A1 Dec. 1, 2005

(51) Int. Cl.  
*G06Q 40/00* (2006.01)

(52) U.S. Cl.  
USPC .................................. 705/35; 705/20; 705/26

(58) Field of Classification Search  
USPC ................... 705/20, 1, 12, 13, 14, 26, 27, 35  
See application file for complete search history.

(56) References Cited

U.S. PATENT DOCUMENTS

| | | |
|---|---|---|
| 3,806,711 A | 4/1974 | Cousins, Jr. |
| 5,053,957 A | 10/1991 | Suzuki |
| 5,224,034 A | 6/1993 | Katz et al. |
| 5,461,708 A | 10/1995 | Kahn |
| 5,497,489 A | 3/1996 | Menne |
| 5,537,590 A | 7/1996 | Amado |
| 5,590,269 A | 12/1996 | Kruse et al. |
| 5,670,984 A | 9/1997 | Robertson et al. |
| 5,689,287 A | 11/1997 | Mackinlay et al. |
| 5,710,887 A | 1/1998 | Chelliah et al. |
| 5,740,448 A | 4/1998 | Gentry et al. |
| 5,758,327 A | 5/1998 | Gardner et al. |
| 5,808,894 A | 9/1998 | Wiens et al. |
| 5,870,717 A | 2/1999 | Wiecha |
| 5,873,069 A | 2/1999 | Reuhl et al. |
| 5,878,400 A | 3/1999 | Carter, III |
| 5,946,666 A | 8/1999 | Nevo et al. |
| 6,009,407 A | 12/1999 | Garg |
| 6,075,530 A | 6/2000 | Lucas et al. |
| 6,078,901 A | 6/2000 | Ching |
| 6,151,031 A | 11/2000 | Atkins et al. |
| 6,211,880 B1 | 4/2001 | Impink, Jr. |
| 6,320,586 B1 | 11/2001 | Plattner et al. |
| 6,434,533 B1 | 8/2002 | Fitzgerald |

(Continued)

FOREIGN PATENT DOCUMENTS

| | | |
|---|---|---|
| WO | WO 99/60486 | 11/1999 |
| WO | WO 00/29995 | 5/2000 |
| WO | WO 2005/119500 | 12/2005 |

OTHER PUBLICATIONS

Origin 7.0 Help (including 21 sheets of screen shots), 2000.

(Continued)

*Primary Examiner* — Ojo O Oyebisi  
(74) *Attorney, Agent, or Firm* — Kang S. Lim (57) ABSTRACT

The present invention presents systems and methods for organizing price modeling data using hierarchically organized portfolios including a collection of transactions in a transaction database representing a first hierarchical level; collections of hierarchically organized portfolios at higher hierarchical levels than a previous hierarchical levels, the hierarchically organized portfolios representing selections from the previous hierarchical level where the hierarchically organized portfolios are arranged to be responsive to an enterprise approval hierarchy.

20 Claims, 5 Drawing Sheets

U.S. PATENT DOCUMENTS

| | | | |
|---|---|---|---|
| 6,553,350 | B2 | 4/2003 | Carter |
| 6,665,577 | B2 | 12/2003 | Onyshkevych |
| 6,678,695 | B1 | 1/2004 | Bonneau et al. |
| 6,785,664 | B2 | 8/2004 | Jameson |
| 6,801,201 | B2 | 10/2004 | Escher |
| 6,812,926 | B1 | 11/2004 | Rugge |
| 6,851,604 | B2 | 2/2005 | Girotto et al. |
| 6,856,967 | B1 | 2/2005 | Woolston et al. |
| 6,907,403 | B1 | 6/2005 | Klein et al. |
| 6,988,076 | B2 | 1/2006 | Ouimet |
| 7,015,912 | B2 | 3/2006 | Marais |
| 7,046,248 | B1 | 5/2006 | Perttunen |
| 7,076,463 | B1 | 7/2006 | Boies et al. |
| 7,080,026 | B2 | 7/2006 | Singh et al. |
| 7,092,929 | B1 | 8/2006 | Dvorak et al. |
| 7,133,848 | B2 | 11/2006 | Phillips et al. |
| 7,149,716 | B2 | 12/2006 | Gatto |
| 7,155,510 | B1 | 12/2006 | Kaplan |
| 7,218,325 | B1 | 5/2007 | Buck |
| 7,233,928 | B2 | 6/2007 | Huerta et al. |
| 7,254,584 | B1 | 8/2007 | Addison, Jr. |
| 7,308,421 | B2 | 12/2007 | Raghupathy et al. |
| 7,315,835 | B1 | 1/2008 | Takayasu et al. |
| 7,343,355 | B2 | 3/2008 | Ivanov et al. |
| 7,555,497 | B2 | 6/2009 | Thompson et al. |
| 7,590,618 | B2 | 9/2009 | Abraham |
| 2001/0003814 | A1 | 6/2001 | Hirayama et al. |
| 2002/0007323 | A1 | 1/2002 | Tamatsu |
| 2002/0032610 | A1 | 3/2002 | Gold et al. |
| 2002/0042782 | A1 | 4/2002 | Albazz et al. |
| 2002/0052817 | A1 | 5/2002 | Dines et al. |
| 2002/0059058 | A1 | 5/2002 | Doolin et al. |
| 2002/0059229 | A1 | 5/2002 | Natsumeda et al. |
| 2002/0062475 | A1 | 5/2002 | Iborra et al. |
| 2002/0072993 | A1 | 6/2002 | Sandus et al. |
| 2002/0099596 | A1 | 7/2002 | Geraghty |
| 2002/0107819 | A1 | 8/2002 | Ouimet |
| 2002/0116348 | A1 | 8/2002 | Phillips et al. |
| 2002/0128953 | A1 | 9/2002 | Quallen et al. |
| 2002/0138402 | A1 | 9/2002 | Zacharia et al. |
| 2002/0152133 | A1* | 10/2002 | King et al. ............ 705/26 |
| 2002/0152150 | A1 | 10/2002 | Cooper et al. |
| 2002/0156695 | A1 | 10/2002 | Edwards |
| 2002/0165726 | A1 | 11/2002 | Grundfest |
| 2002/0165760 | A1 | 11/2002 | Delurgio et al. |
| 2002/0178077 | A1 | 11/2002 | Katz et al. |
| 2002/0184134 | A1 | 12/2002 | Olsen et al. |
| 2002/0188576 | A1 | 12/2002 | Peterson et al. |
| 2002/0194051 | A1 | 12/2002 | Hall et al. |
| 2003/0009411 | A1 | 1/2003 | Ram et al. |
| 2003/0028451 | A1 | 2/2003 | Ananian |
| 2003/0033240 | A1 | 2/2003 | Balson et al. |
| 2003/0095256 | A1 | 5/2003 | Cargill et al. |
| 2003/0110066 | A1 | 6/2003 | Walser et al. |
| 2003/0115129 | A1 | 6/2003 | Feaver et al. |
| 2003/0126053 | A1 | 7/2003 | Boswell et al. |
| 2003/0130883 | A1 | 7/2003 | Schroeder et al. |
| 2003/0167209 | A1 | 9/2003 | Hsieh |
| 2003/0172014 | A1 | 9/2003 | Quackenbush et al. |
| 2003/0191723 | A1 | 10/2003 | Foretich et al. |
| 2003/0195810 | A1 | 10/2003 | Raghupathy et al. |
| 2003/0195832 | A1 | 10/2003 | Cao et al. |
| 2003/0200185 | A1 | 10/2003 | Huerta et al. |
| 2003/0225593 | A1 | 12/2003 | Ternoey et al. |
| 2003/0229552 | A1 | 12/2003 | Lebaric et al. |
| 2004/0024715 | A1 | 2/2004 | Ouimet |
| 2004/0049470 | A1 | 3/2004 | Ouimet |
| 2004/0078288 | A1 | 4/2004 | Forbis et al. |
| 2004/0117376 | A1 | 6/2004 | Lavin et al. |
| 2004/0128225 | A1 | 7/2004 | Thompson et al. |
| 2004/0133526 | A1 | 7/2004 | Shmueli et al. |
| 2004/0193442 | A1 | 9/2004 | Kimata et al. |
| 2004/0267674 | A1 | 12/2004 | Feng et al. |
| 2004/0267676 | A1 | 12/2004 | Feng et al. |
| 2005/0004819 | A1 | 1/2005 | Etzioni et al. |
| 2005/0015319 | A1 | 1/2005 | Guler et al. |
| 2005/0096963 | A1 | 5/2005 | Myr et al. |
| 2005/0197857 | A1 | 9/2005 | Avery |
| 2005/0197971 | A1 | 9/2005 | Kettner et al. |
| 2005/0256778 | A1 | 11/2005 | Boyd et al. |
| 2005/0278227 | A1 | 12/2005 | Esary et al. |
| 2006/0004861 | A1 | 1/2006 | Albanese et al. |
| 2006/0069585 | A1 | 3/2006 | Springfield et al. |
| 2006/0241923 | A1 | 10/2006 | Xu et al. |

OTHER PUBLICATIONS

Microsoft Excel 2000, 1985-1999.
Marn, Michael V. and Robert L. Rosiello, "Managing Price, Gaining Profit," Harvard Business Review, pp. 84-93 (Sep.-Oct. 1992).
International (PCT) Search Report re PCT/US2005/0141879 mailed Apr. 16, 2007.
Written Opinion re PCT/US2005/014879 mailed Apr. 16, 2007.
PCT International Search Report, Application No. PCT/US07/11571, mailed Jan. 7, 2008.
PCT International Search Report, Application No. PCT/US07/10754, mailed Nov. 7, 2007.
Written Opinion of the International Searching Authority, Application No. PCT/US05/14981, mailed Nov. 27, 2006.
Written Opinion of the International Searching Authority, Application No. PCT/US05/14883, mailed Oct. 3, 2006.
"Net Commerce Launches Its FastTrack Configurator and FasPac Catalog Utility", Apr. 17, 2001, Business Wire. New York. p. 1.
"SPEX Assesses B2C and B2B Electronic Commerce Software Maturity", PR Newswire. New York: p. 1.
Murphy, Diane R., "The Exciting Role of the Credit Manager in the Expanding E-Commerce Marketplace", Business Credit, vol. 10, No. 9, p. 64, Oct. 2000.
Spanbauer, Scott et al., "You've got E-mail", PC World, vol. 16, No. 6, p. 135, Jun. 1998.
Beidl, Richard et al., "The Coming of Risk-Based Pricing: Part Two", Oct. 2000, Mortgage Banking, Washington, vol. 61, Issue 1.
Kenton, Kenton B. et al., "Planning a Revenue Stream System in an E-Business Environment", 2001, Industrial Management—Data Systems, p. 406-413, 8/9;ABI/Inform Global.
"eMerchant, magic Software's Powerful New Business-to-Business E-commerce Solution. Wins 'Best of Show' at Internet Commerce Expo", Apr. 1, 1999, Business Wire, (2 pages).
Bourne, Humphrey, "Pricing the Strategic Implications", Mar. 1999, Management Accounting. Magazine for Chartered Management Accountants; vol. 77, Issue 3.
PCT International Search Report and the Written Opinion of the International Searching Authority, Application No. PCT/US07/18663, mailed Aug. 26, 2008.
Bhattacharya, Anindya et al. "Using 'smart' pricing to increase profits and maximize customer satisfaction", Aug. 2001, The National Public Accountant; vol. 25, Issue 6.
Kim, Byung-Do et al., "Modeling the Distribution of Price Sensitivity and Implications for Optimal Retail Pricing", Jul. 1995, Journal of Business & Economic Statistics; vol. 13, Issue 3.
Levy, Michael et al., "Emerging Trends in Retail Pricing Practice: Implications for Research", 2004, Journal of Retailing; vol. 80.
Hung, Chao-Shun, "Conjectural Variations and Market Performance in a Differentiated Product Industry", Dec. 1991, Atlantic Economic Journal; vol. 19, Issue 4.
Dawes, John, "Assessing the Impact of a Very Successful Price Promotion on Brand, Category and Competitor Sales", 2004, The Journal of Product and Brand Management; vol. 13, Issue 5.
Leeflang, Peter S. H. et al., "Marketing Decisions Based on Econometric Models", Spring 2002, Marketing Research; vol. 14, Issue 1.
Dawes, John, "Price Changes and Defection Levels in a Subscription-Type Market: Can an Estimation Model Really Predict Defecation Levels?", The Journal of Services Marketing; vol. 18, Issue 1.
Lucke, Dorothea et al., "A Note on R&D and Price Elasticity of Demand," Nov. 2005, Jahrbucher fur Nationalokonomie and Statistik; vol. 225, Issue 6.
Caru, Antonella et al. "Profitability and Customer Satisfaction in Services: An Integrated Perspective Between Marketing and Cost Management Analysis", 1999, International Journal of Service Industry Management; vol. 10, Issue 2.

Tollefson, John O. et al., "Aggregation Criteria in Normative Market Segmentation Theory", Aug. 1978, Journal of Marketing Research; vol. 15.

Coulter, Keith S., "Decreasing Price Sensitivity Involving Physical Product Inventory: A Yield Management Application", 2001, The Journal of Product and Brand Management; vol. 10, Issue 5.

Mills, Don, "Oil Rises on Report Showing Gasoline Supply Decline", National Post, Ont; May 30, 2003.

Keenan, Faith, "The Price is Really Right," Business Week, Mar. 31, 2003.

Chan Choi, S., Desarbo, W. S., Harker, P. T. "Product Positioning under Price Competition." Feb. 1990. Management Science, vol. 36, Issue 2, pp. 175-199.

Kirschen, D. S., Strbac, G., Cumperayot, P., de Paiva Mendes, D. "Factoring the Elasticity of Demand in Electricity Prices." May 2000. IEEE Transactions on Power Systems, vol. 15, No. 2, pp. 612-617.

Walker, Kenton B. et al., "Planning a Revenue Stream System in an E-Business Environment", 2001, Industrial Management—Data Systems, p. 406-413, 8/9;ABI/Inform Global.

* cited by examiner

SYSTEM AND METHOD FOR ORGANIZING PRICE MODELING DATA USING HIERARCHICALLY ORGANIZED PORTFOLIOS

BACKGROUND

At least one primary goal of price modeling is to construct models to capture objective data in order to analyze present price behavior, to create policies responsive to the analysis, and to predict future price behavior. Systems like, for example, SAP™, attempt to manage and control business processes using objective data in order to gain enterprise efficiencies. By manipulating objective data, these systems offer consistent metrics upon which businesses may make informed decisions and policies regarding the viability and direction of their products and services. However, in many cases, the decisions and policies may be difficult to procure as a result of the volume and organization of relevant data and may be difficult to implement as both temporal restraints and approval processes may inhibit rapid deployment of valuable information.

Figure 1:
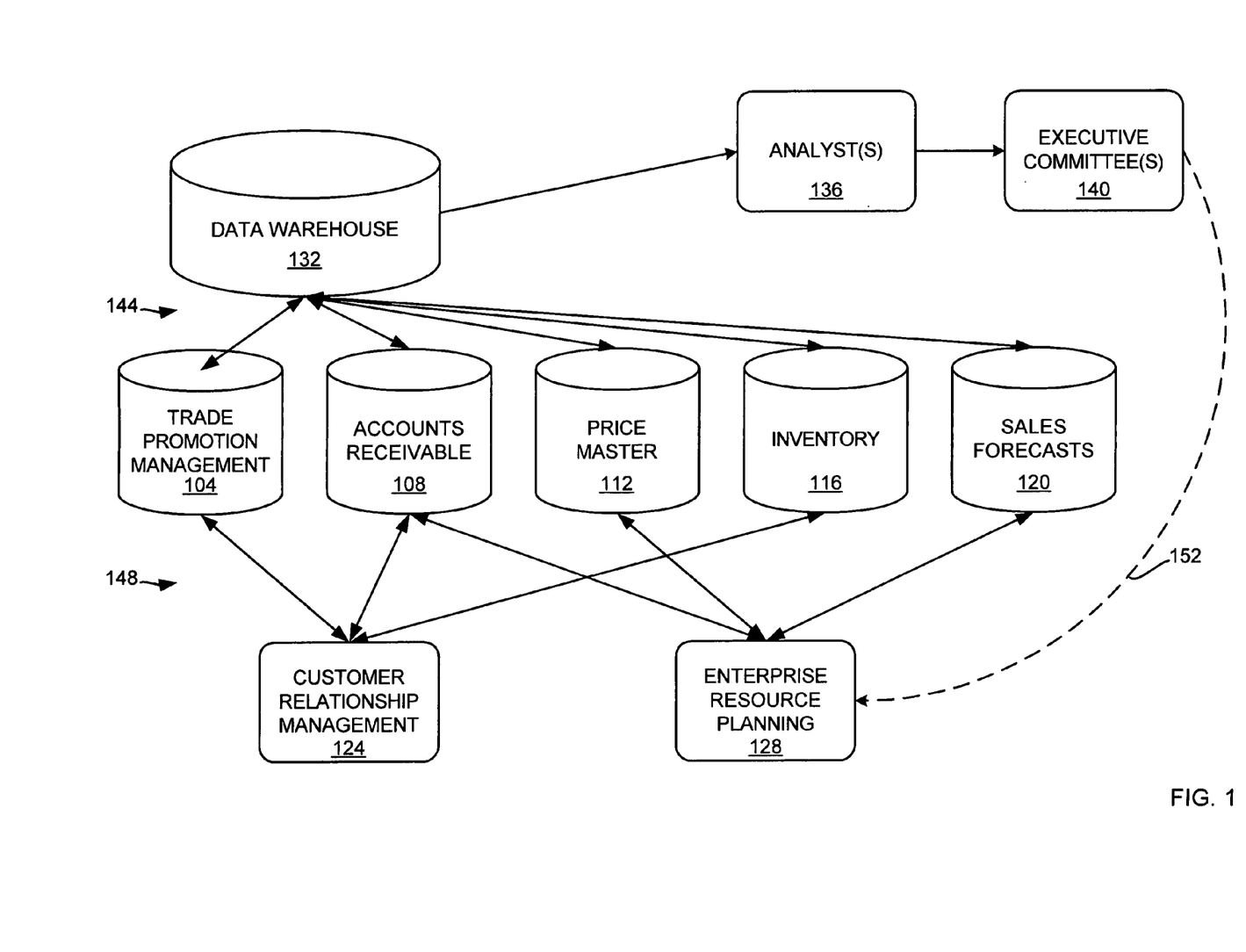
FIG. 1 is a simplified graphical representation of an enterprise pricing environment.

For example, referring to FIG. 1, FIG. 1 is a simplified graphical representation of an enterprise pricing environment. Several example databases (104-120) are illustrated to represent the various sources of working data. These might include, for example, Trade Promotion Management (TPM) 104, Accounts Receivable (AR) 108, Price Master (PM) 112, Inventory 116, and Sales Forecasts 120. The data in those repositories may be utilized on an ad hoc basis by Customer Relationship Management (CRM) 124, and Enterprise Resource Planning (ERP) 128 entities to produce and post sales transactions. The various connections 148 established between the repositories and the entities may supply information such as price lists as well as gather information such as invoices, rebates, freight, and cost information.

The wealth of information contained in the various databases (104-120) however, is not "readable" by executive management teams due in part to accessibility and in part to volume. That is, even though the data in the various repositories may be related through a Relational Database Management System (RDMS), the task of gathering data from disparate sources can be complex or impossible depending on the organization and integration of legacy systems upon which these systems may be created. In one instance, all of the various sources may be linked to a Data Warehouse 132 by various connections 144. Typically, the data from the various sources is aggregated to reduce it to a manageable or human comprehensible size. Thus, price lists may contain average prices over some selected temporal interval. In this manner, the data may be reduced. However, with data reduction, individual transactions may be lost. Thus, CRM 124 and ERP 128 connections to an aggregated data source may not be viable.

Analysts 136, on the other hand, may benefit from the aggregated data from a data warehouse. Thus, an analyst 136 may compare average pricing across several regions within a desired temporal interval and then condense that analysis into a report to an executive committee 140. An executive committee 140 may then, in turn, develop policies directed toward price structuring based on the analysis returned from an analyst 136. Those policies may then be returned to CRM 124 and ERP 128 entities to guide pricing activities via some communication channel 152 as determined by a particular enterprise.

As can be appreciated, a number of complexities may adversely affect this type of management process. First, temporal setbacks exist at every step of the process. For example, a CRM 124 may make a sale. That sale may be entered into a sales database 120, and INV database 116, and an AR database 108. The entry of that data may be automatic where sales occur at a network computer terminal, or may be entered in a weekly batch process. Another example of a temporal setback is the time-lag introduced by batch processing data stored to a data warehouse resulting in weeks-old data that may not be timely for real-time decision support. Still other temporal setbacks may occur at any or all of the transactions illustrated in this figure that may ultimately render results untimely at best and irrelevant at worst. A second drawback to this process is related to delay in that approval processes from executive committees to sales transactions may inhibit sales productivity due to uncertainty in the responsibility structure of the management team. As such, methods of analyzing objective structured data, integrating that analysis into coherent and relevant business policies, and integrating those policies in a timely and efficient manner may be desirable to achieve price modeling efficiency and accuracy.

In view of the foregoing, methods of price modeling closed loop analytics in a hierarchically organized portfolio management system are disclosed.

SUMMARY

The present invention presents systems and methods for organizing price modeling data using hierarchically organized portfolios including a collection of transactions in a transaction database representing a first hierarchical level; collections of hierarchically organized portfolios at higher hierarchical levels than a previous hierarchical levels, the hierarchically organized portfolios representing selections from the previous hierarchical level where the hierarchically organized portfolios are arranged to be responsive to an enterprise approval hierarchy.

Another embodiment of the present invention presents a method for organizing price modeling data using hierarchically organized portfolios including the steps of, providing a collection of transactions in a transaction database representing a first hierarchical level; generating collections of hierarchically organized portfolios at a higher hierarchical level than a previous hierarchical level, the hierarchically organized portfolios representing selections from the previous hierarchical level where the hierarchically organized portfolios are arranged to be responsive to an enterprise approval hierarchy.

In still other embodiments of the present invention provides a computer program product in a computer readable media for displaying price modeling data, the computer program product including, a transaction database populated with a collection of transactions representing a first hierarchical level; a portfolio module for creating collections of hierarchically organized portfolios at a higher hierarchical level than a previous hierarchical level, the hierarchically organized portfolios representing selections from the previous hierarchical level where the hierarchically organized portfolios are arranged to be responsive to an enterprise approval hierarchy.

BRIEF DESCRIPTION OF THE DRAWINGS

Embodiments of the invention may best be understood by reference to the following description taken in conjunction with the accompanying drawings in which.

DETAILED DESCRIPTION

Figure 2:
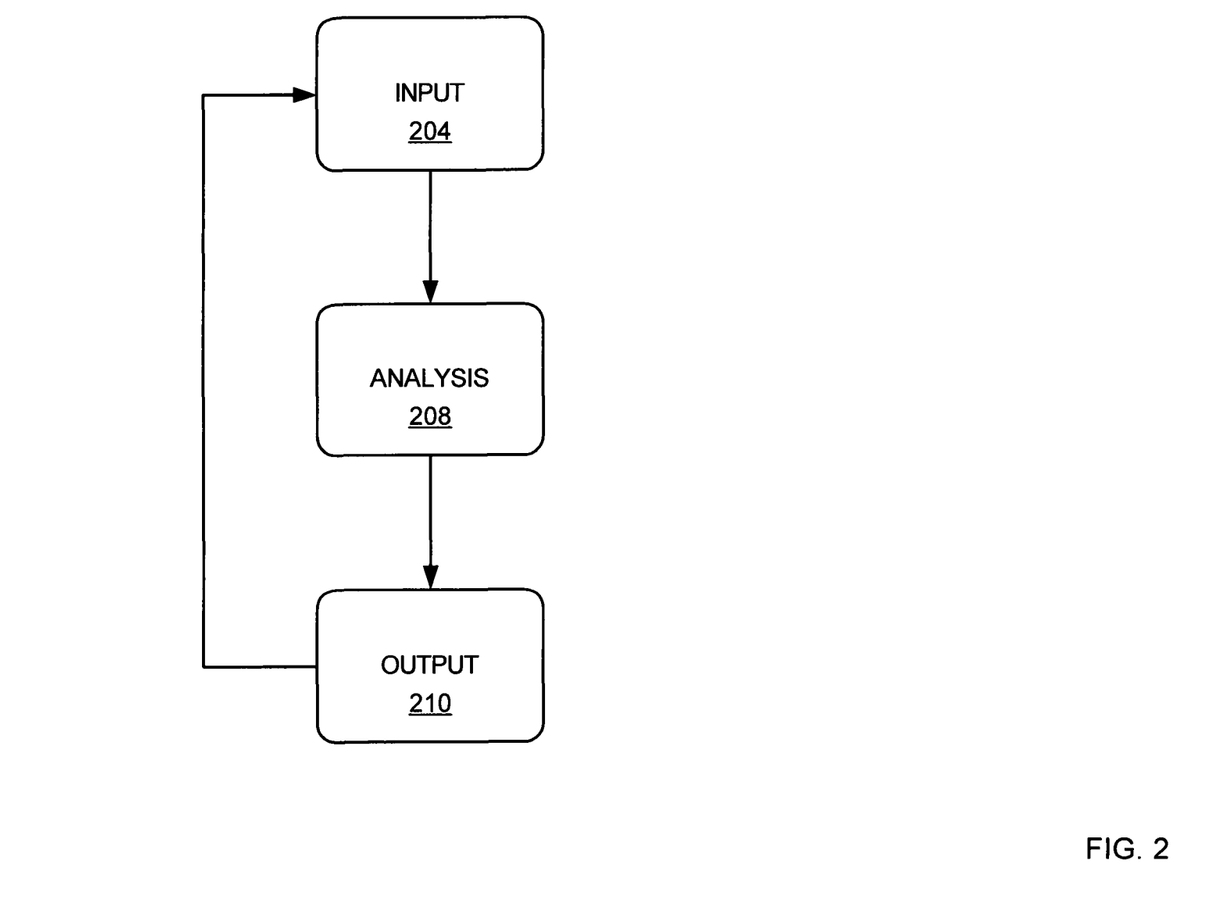
FIG. 2 is a simplified graphical representation of a closed-loop system.

FIG. 2 is a simplified graphical representation of a closed-loop system. As can be appreciated closed-loop systems are common in, for example, the mechanical and electromechanical arts. In general, a closed-loop system is a control system in which the output is continuously modified by feedback from the environment. As illustrated, for example, an input at a step 204 would be a feedback element. Inputs may be any desired indicator or metric that is measurable in some way. For example, an input may be a temperature reading taken from a thermocouple sensor. The input is then analyzed at a step 208. Many types of analysis are available depending on the intended use. A simple comparison against a set value is one example. Another example might include advanced statistical analysis where appropriate. Thus, as can be appreciated, analysis in closed-loop systems may be highly complex.

An output is generated next at a step 210 based on the analysis of step 208. An output may be any operation that is intended to affect a condition of the desired system. In the above thermocouple example, a temperature may be read (e.g., input); compared against a set temperature (analysis); and affected by turning on or off a heating element depending on the comparison (output). Finally, the system loops back to the input and continues until the system, or a user terminates the process.

Figure 3:
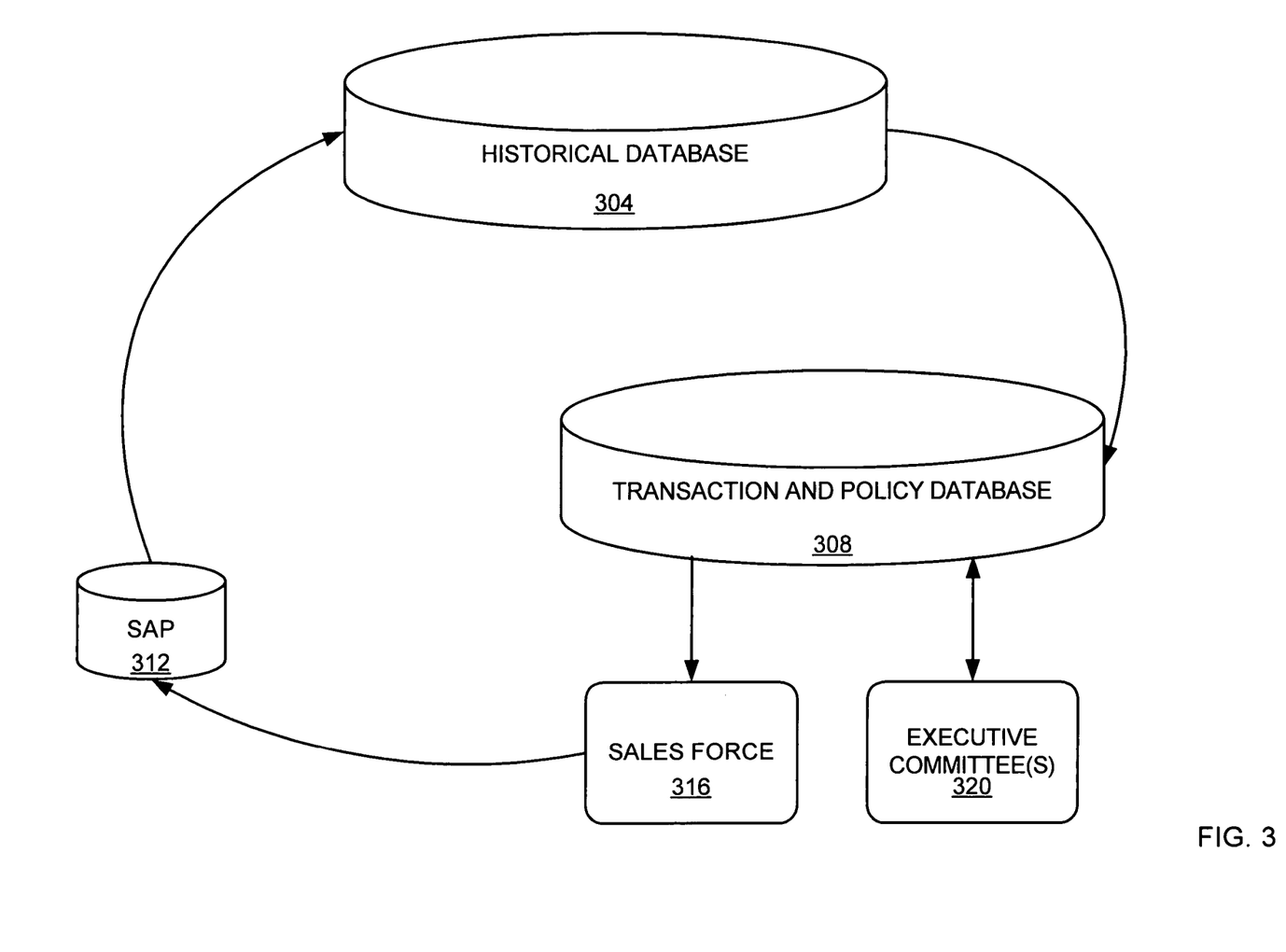
FIG. 3 is a simplified graphical representation of a closed-loop implementation of an embodiment of the present invention.

As pertains to the present invention, FIG. 3 is a simplified graphical representation of a closed-loop implementation of an embodiment of the present invention in a price modeling environment. At a first step 304, data is input into a historical database. A historical database, under the present invention may contain any of a number of inputs. In one embodiment of the present invention, a historical database may include sales transactions. In other embodiments of the present invention, a historical database may include waterfall records. A group of associated waterfall records may be defined as a price adjustment continuum. For example, in a transactional sales environment, an invoice price from a transaction may be affected by a rebate such that: invoice price=retail price–rebate. In this example, one waterfall record is a rebate. The rebate represents a price adjustment to the retail price that affects the invoice price. Rebate may also be thought of as a "leakage" in that the profitability of a sale is indirectly proportional to the amount of leakage in a given system. In a price modeling environment, metrics, like rebates for example, that may affect the profitability of a transaction, may be stored at a transaction level in a historical database. Many waterfall records may exist for a transaction like, for example: industry adjustments, sales discretion, shipping charges, shipping allowances, late payment costs, extended terms costs, consignment costs, returns, packaging costs, base material costs, additive costs, processing costs, variable costs, shortfalls, overages, and the like.

The analysis of the data may then automatically generate a transaction and policy database 308. For example, analysis of a selected group of transactions residing in a historical database may generate a policy that requires or suggests a rebate for any sale in a given region. In this example, some kind of logical conclusion or best guess forecast may have determined that a rebate in a given region tends to stimulate more and better sales. This policy is thus guided by historical sales transactions over a desired metric—in this case, sales by region. The policy may then be used to generate logic that will then generate a transaction item. In this example, the logic may have the form:

If customer year-to-year sales growth is greater than X, then rebate=Y%

In this manner, a price list of one or many items reflecting a calculated rebate may be automatically conformed to a given policy and stored for use by a sales force, for example. In some embodiments, policies are derived strictly from historical data. In other embodiments, policies may be generated ad hoc in order to test effects on pricing based hypothetical scenarios. In still other examples, executive committee(s) 320, who implements policies, may manually enter any number of policies relevant to a going concern. In this manner, policies may be both automatically and manually generated and introduced into the system.

After transactions are generated based on policies, the transactional portion of the database may be used to generate sales quotes by a sales force 316 in SAP 312, for example. SAP may then generate a sales invoice which may then, in turn, be used to further populate a historical database 304, which closes the loop. In some embodiments, sales invoices may be constrained to sales quotes generated by a transaction and policy database. That is, as an example, a sales quote formulated by a sales force 316 may require one or several levels of approval based on variance (or some other criteria) from policies stored in a transaction and policy database 308. In other embodiments, sales invoices are not constrained to sales quotes generated by a transaction and policy database.

By applying closed-loop logic to a price modeling environment, pricing advantages may be achieved. In one example, workflow efficiencies may be realized where "successful" sales are tracked and policies supporting activities corresponding to the "successful" sales are implemented. The determination of "successful" in terms of a sale may be defined in any of a number of ways including, for example, increased profitability or volume. In this manner, an enterprise allows real market results to drive sales' policy rather than basing policy solely on theoretical abstractions. In other examples, hypothetical changes to policies may be tested. Thus, for example, a suggested policy requiring a rebate for any sale over $1000.00 may be implemented to test the effect on overall margins without actually modifying existing policies. In that case, a suggested policy change may reveal insight into future sales transactions that result in no net effect on margins, or may reveal insight into areas that require further adjustment to preserve or increase margins.

Another advantage to the system is that policy may flow directly from input data in an efficient manner. Individual spreadsheets and analysis typically used in price modeling may no longer be necessary. Instead, executive committees have access to real-time data that is continually updated to reflect current sales and sales practices. Response to a given policy may be seen or inferred directly from a historical database and implemented directly on a transaction and policy database. Thus, temporal efficiencies are achieved.

In still other examples, a closed-loop system may be used to evaluate individual or grouped transactions as, for example, in a deal making context. That is, a salesperson may generate a quote for a given customer and submit that quote for comparison against a policy formulated transaction in a transaction and policy database. A comparison may reveal some basis upon which a quote may represent a profitable deal. In some embodiments, a deal indicator may be generated. A deal indicator may be a ratio of the quote against a composite index that generates a value between 0 and 1 corresponding to profitability. In this example, a ratio returning unity (i.e. 1) indicates a deal is in conformance with established policy. It may be appreciated that a ratio may be defined in any of a number of manners without departing from the present invention.

In other embodiments, a deal suggestion may be generated. A deal suggestion may provide a range of acceptable (i.e. profitable) pricing based on quote parameters. Thus, a quote having deal specific set parameters like, for example, a fixed shipping price may return a range of allowable rebates or a range of allowable sales discretion that account for a fixed shipping input. In still other embodiments, deal guidance may be provided. Deal guidance provides non-numeric suggestion for a given quote. Thus, deal guidance might, for example, return "acceptable deal," or "unacceptable deal" in response to a given quote. Policy considerations underlie deal indicators, deal suggestions, and deal guidance. Availability of these comparisons allows a user to select a comparison best fitted to their sales techniques and preferences which may result in sales efficiencies.

Figure 4:
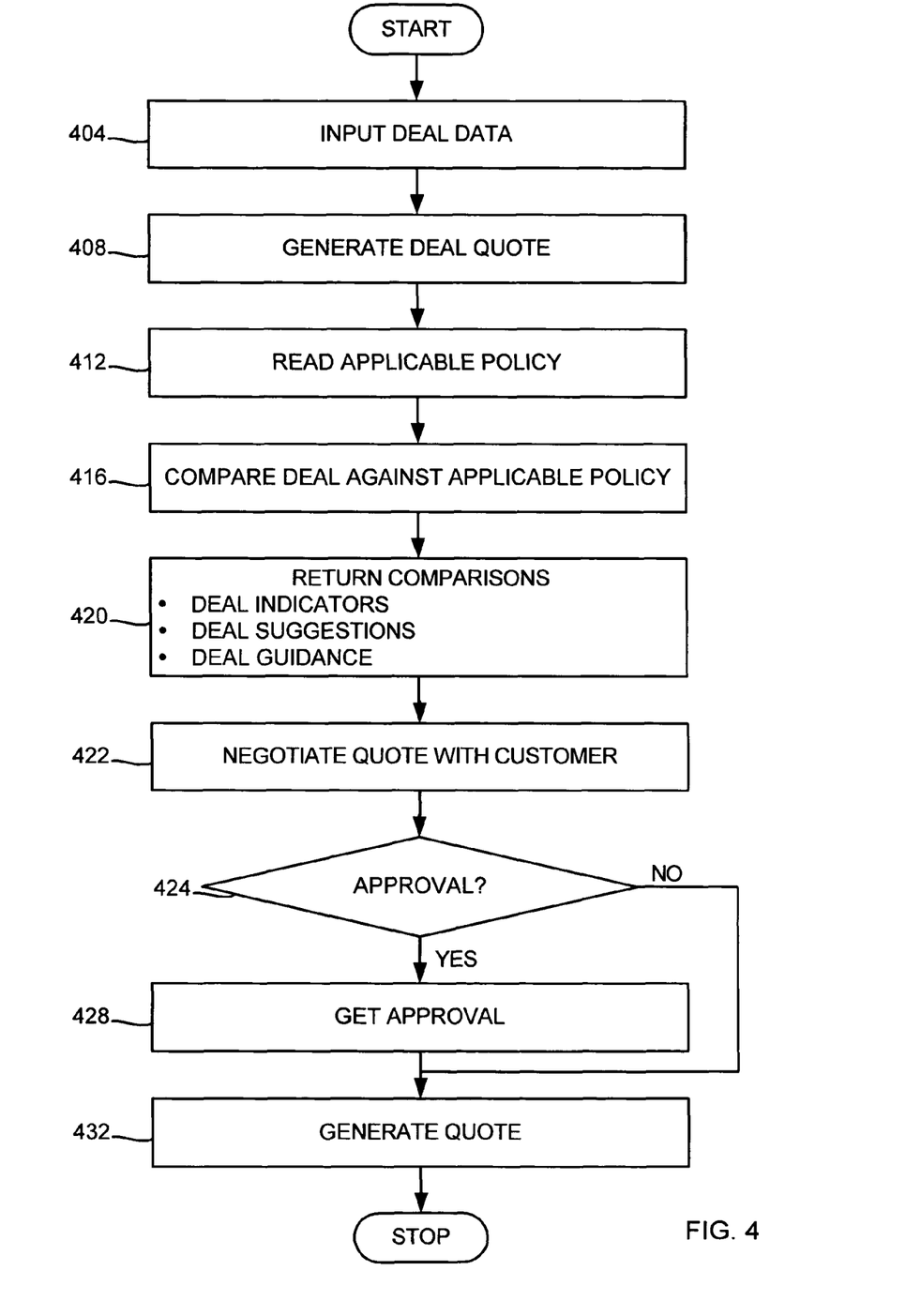
FIG. 4 is a flow chart of an embodiment of the present invention based on a closed-loop system; and e.

An example embodiment of the present invention using a closed-loop system is next presented. FIG. 4 is a flow chart of an embodiment of the present invention based on a closed-loop system. At a first step, 404 deal data is input into the system. Deal data may include any of a number of inputs like, for example, shipping costs, rebate, discounts, and the like. A deal quote may then be generated at a step 408 calculated from the deal data input at a step 404 and further including any missing field items based on policy considerations. Applicable policy is then read at a step 412. Applicable policy may be automatically selected or user selected by a particular metric. For example, policy may be utilized based on global metrics or may be delimited by region.

After the applicable policy is read at a step 412, a deal quote may then be compared against applicable policy at a step 416. As noted above, a comparison may reveal some basis upon which a quote may represent a profitable deal. Comparisons are then returned for review by a user at a step 420. As noted above, comparisons may include deal indicators, deal suggestions, and deal guidance. An advantage of returning a comparison is that a complex analysis may be reduced to a readily ascertainable form. In this case, a deal indicator may return a ratio; a deal suggestion may return an acceptable range of values; and deal guidance may return a non-numeric suggestion for a given deal. Thus, a deal maker may determine, at a glance, the acceptability based on policy of a given quote.

Once comparisons are returned at a step 420, a quote may be negotiated at a step 422 that may or may not incorporate any or all of those corresponding comparisons. In this manner, a salesperson negotiating a deal may flexibly structure a deal with confidence that the deal may be constrained to comparison parameters resulting in a profitable deal for an enterprise. In one embodiment, entering a negotiated transaction initiates a recalculation of comparisons. Thus, a deal maker may view real-time changes to a deal structure as a deal is being formed. This feature is particularly useful in that final negotiating point parameters may be expanded or contracted as a deal progresses providing a deal maker with an increasingly better defined negotiating position.

After a quote negotiation is complete at a step 422, the method determines whether approval is needed at a step 424. Approval, in this context, may be coupled with a portfolio manager. A portfolio manager may be utilized in an embodiment of the present invention to efficiently expedite approval of pending deals. Approval may include one or more levels depending on variance from an explicit or implicit policy. That is, for a particular deal that greatly varies from a policy, higher authority must approve of that particular deal. For example, a deal offering a rebate that is within policy limits may not require approval while a similar deal offering a rebate that falls outside of policy limits by, for example, 25% may need a sales manager or higher approval. Approval may be linked upward requiring executive officer approval in some cases. Portfolio management will be discussed in further detail below for FIG. 5.

If approval is needed, then a deal must be approved at a step 428. The method then continues at a step 432 to generate a quote. If approval at a step 428 is not needed, the method continues at a step 432 to generate a quote. As can be appreciated, a quote may then be used to generate an invoice. However, an invoice may or may not match the quote upon which it is based. Rather, an invoice represents an actual sale. It is the data from an actual sale that continues to populate a historical database. The method then ends.

As noted above, a portfolio manager may efficiently expedite approval of pending deals. Enterprises, as a practical reality, have a mix of "good" and "bad" deals—good deals being defined as profitable. Evaluating deals in isolation may not maximize profits at an enterprise level. For example, industries having large fixed costs may accept a number of high volume "bad" deals in order to capture a number of low volume "good" deals resulting in an overall profit. Industries evaluating deals in isolation may not realize this benefit and thus may not be able to survive. Portfolio organization, therefore, assists, for example, sales managers maximize profitability for an enterprise by allowing those managers to view enterprise level effects of a deal or groups of deals.

Figure 5:
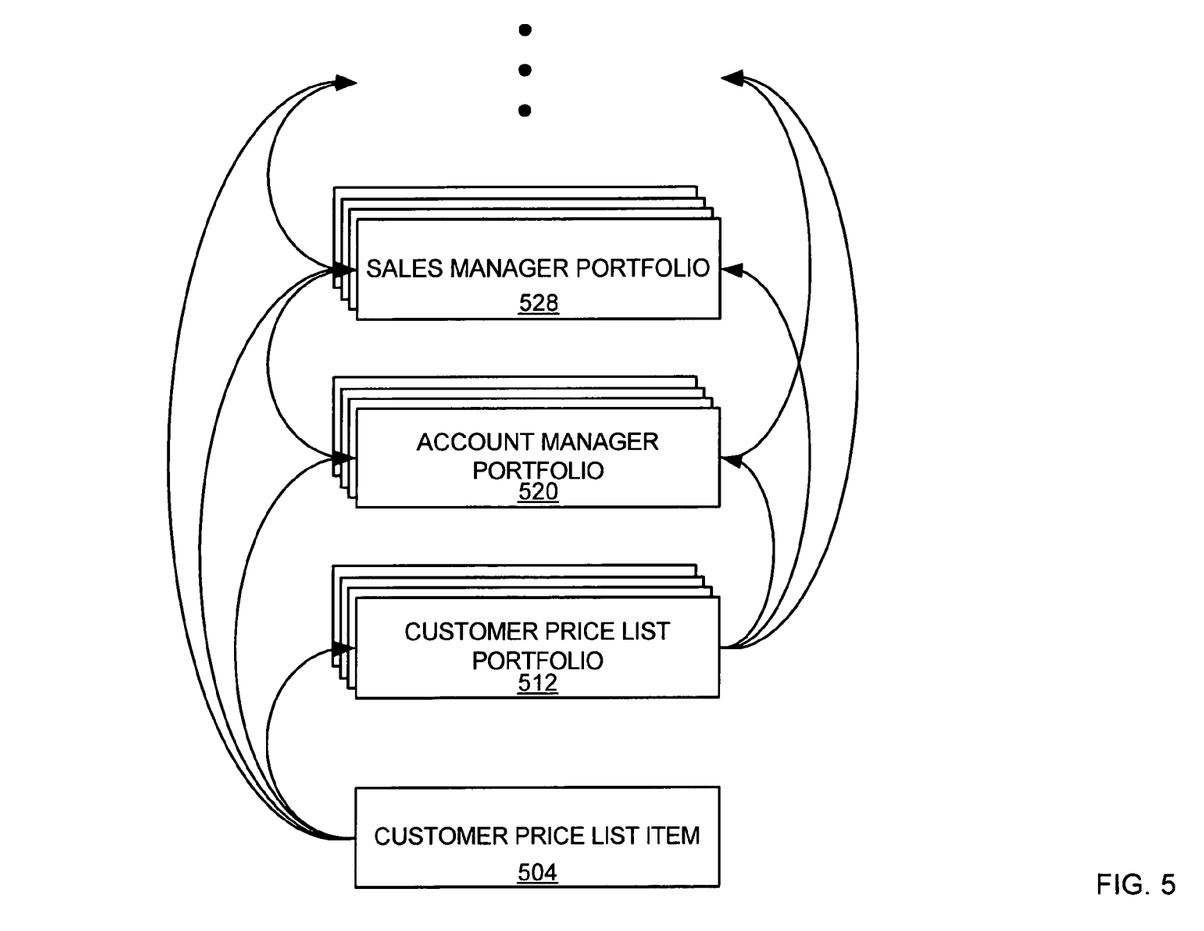
FIG. 5 is a schematic representation of a portfolio hierarchy in accordance with an embodiment of the present invention.

As seen in FIG. 5, FIG. 5 is a schematic representation of a portfolio hierarchy in accordance with an embodiment of the present invention. A customer price list item 504 exists at the root of the hierarchy as an item. Each item may be configured to require approval on a pending deal, or may be configured to ignore approval on a pending deal. The customer price list item 504 may contain any of a number of descriptive and/or numeric terms such as price, description, availability, etc., for example. In one example, customer price list items 504 may be grouped into a portfolio known as customer price list portfolio 512.

Customer price list portfolios comprise customer price list items grouped according to a desired criteria or criterion. For example, price lists may be organized by cost, by type, by distributor, by region, by function, and by any other selected parameter. In this manner, approval, as an example, for a group of items—items under $1.00 for example—may be required or ignored. By grouping items, approval processes may be retained only for selected key products. In one embodiment, one or more criteria may be utilized to organize customer price list portfolio. It can further be appreciated that many other combinations of groupings for portfolios are possible. Thus, for example, a sales manager portfolio may comprise: customer price list items 504; customer price list portfolios 512; or account manager portfolios 520 as indicated by multiple arrows in FIG. 5. Further, in this example, a customer price list portfolio 512 is a static portfolio. That is, a static portfolio does not change according to a formula or algorithm. Rather, a static portfolio is entered and modified manually. It may be appreciated that most, if not all, portfolios may either be static portfolios or dynamic portfolios.

Customer price list portfolios 512 may then be organized to generate an account manager portfolio 520. Account manager portfolios 520, in this example, comprise customer price list portfolios 512 grouped according to a desired criteria or criterion. Typically, accounts may be organized by named companies or individuals. In addition to organizing accounts by name, accounts may be organized by approval. That is, all approval accounts may be managed singly or in group thus facilitating policy implementation. For example, an account portfolio may be organized such that any account having a 12-month history of on-time transactions no longer needs approval so that approval is ignored. In this way, an on-time account may accrue a benefit of an expedited approval thus making transactions more efficient for both the sales person and the account. Further, in this example, an account manager portfolio is of the type-static portfolio. As noted above, a static portfolio does not automatically change according to a formula or algorithm.

Account portfolios 520 may be further organized to generate sales manager portfolios 528. Sales manager portfolios 528, in this example, comprise account manager portfolios 520 grouped according to a desired criteria or criterion. Typically, sales manager portfolios may be organized by named individuals or groups of individuals. In addition to organizing sales manager portfolios by name, sales manager portfolios may be organized by approval. As noted above, approval based portfolios may be managed singly or in group thus facilitating policy implementation. For example, a sales manager portfolio may be organized such that sales people with seniority no longer need approval for deals under a capped amount. In this way, sales people with more experience benefit from an expedited approval process since presumably more experienced sales people have a deeper understanding of company policies and priorities. In addition, as new policy is generated, approvals may be reinstated as a training measure so that policies may more effectively be incorporated into a workflow. In this example, a sales manager portfolio 528 is of the type-dynamic portfolio. Dynamic portfolios may be generated according to formula or algorithm. For example, a sales manager portfolio may be generated for all sales associates whose total billing exceeds a desired dollar amount. In this way, managers may creatively and efficiently differentiate productive and unproductive sales associates and may further apply varying levels of approval.

As can be appreciated, the examples described herein detail an approval based hierarchy in an embodiment of the present invention. Other hierarchical methods and uses that may be used in combination with approval based hierarchy are contemplated by the present invention. Additionally, approval hierarchy, as described above, may also include varying levels of visibility. That is, at any given level of portfolio, a user may define which entities may access which portfolios.

While this invention has been described in terms of several preferred embodiments, there are alterations, permutations, modifications and various substitute equivalents, which fall within the scope of this invention. For example, the portfolios illustrated in FIG. 5 are illustrative only and may be organized at many levels within an approval hierarchy in numerous ways as noted above. It should also be noted that there are many alternative ways of implementing the methods and systems of the present invention. It is therefore intended that the following appended claims be interpreted as including all such alterations, permutations, modifications, and various substitute equivalents as fall within the true spirit and scope of the present invention.

What is claimed is:

1. A system for organizing price modeling data using hierarchically organized portfolios, useful in association with a business policy, the system comprising:
   a collection of transactions in a transaction database representing a first hierarchical level, wherein the collection of transactions includes data corresponding to a plurality of items, and wherein plurality of items belong to one of a first portfolio of items requiring approval on a pending deal, and a second portfolio of items configured to ignore approval on the pending deal;
   at least one collection of at least one hierarchically organized portfolio at a higher hierarchical level than a previous hierarchical level, wherein the at least one collection of at least one hierarchically organized portfolio is generated by an algorithm that sorts sales associates by measured productivity indicators, the at least one hierarchically organized portfolio representing at least one selection from the previous hierarchical level, and wherein the pending deal requires approval at the at least one hierarchically organized portfolio if the value of the pending deal is above a capped amount; and
   wherein the hierarchically organized portfolios are arranged to be responsive to an enterprise approval hierarchy of the enterprise selling the plurality of items, wherein the approval criteria includes more than one authority level within the enterprise selling the plurality of items, and wherein each authority level is linked to a variance from the business policy, and wherein approval is only required when a deal offering falls outside limits of the business policy.

2. A computer implemented method for organizing price modeling data using hierarchically organized portfolios, useful in association with a business policy, the method comprising:
   providing a collection of transactions in a transaction database representing a first hierarchical level, wherein the collection of transactions includes data corresponding to a plurality of items, and wherein plurality of items belong to one of a first portfolio of items requiring approval on a pending deal, and a second portfolio of items configured to ignore approval on the pending deal;
   generating at least one collection of at least one hierarchically organized portfolio at a higher hierarchical level than a previous hierarchical level, wherein the at least one collection of at least one hierarchically organized portfolio is generated by an algorithm that sorts sales associates by measured productivity indicators, the at least one hierarchically organized portfolio representing at least one selection from the previous hierarchical level, and wherein the pending deal requires approval at the at least one hierarchically organized portfolio if the value of the pending deal is above a higher capped amount; and
   wherein the hierarchically organized portfolios are arranged to be responsive to an enterprise approval hierarchy of the enterprise selling the plurality of items, wherein the approval criteria includes more than one authority level within the enterprise selling the plurality of items, and wherein each authority level is linked to a variance from the business policy, and wherein approval is only required when a deal offering falls outside limits of the business policy.

3. A computer program product in a computer readable media, when executed by a processor for displaying price modeling data, useful in association with a business policy, the computer program comprising:

computer readable media executed by a processor for populating a transaction database with a collection of transactions representing a first hierarchical level, wherein the collection of transactions includes data corresponding to a plurality of items, and wherein plurality of items belong to one of a first portfolio of items requiring approval on a pending deal, and a second portfolio of items configured to ignore approval on the pending deal;

computer readable media executed by the processor for a portfolio module for creating at least one collection of at least one hierarchically organized portfolio at a higher hierarchical level than a previous hierarchical level, wherein the at least one collection of at least one hierarchically organized portfolio is generated by an algorithm that sorts sales associates by measured productivity indicators, the at least one hierarchically organized portfolio representing at least one selection from the previous hierarchical level, and wherein the pending deal requires approval at the at least one hierarchically organized portfolio if the value of the pending deal is above a capped amount; and     wherein the hierarchically organized portfolios are arranged to be responsive to an enterprise approval hierarchy of the enterprise selling the plurality of items, wherein the approval criteria includes more than one authority level within the enterprise selling the plurality of items, and wherein each authority level is linked to a variance from the business policy, and wherein approval is only required when a deal offering falls outside limits of the business policy.

4. The method of claim 2 wherein the at least one collection of at least one hierarchically organized portfolio includes a plurality of customer price list portfolios.

5. The method of claim 4 wherein each of the plurality of customer price list portfolios includes a plurality of customer price list items which are organized according to a desired price list criteria.

6. The method of claim 5 wherein the desired price list criteria includes one of a cost criteria, a type criteria, a distributor criteria, a region criteria and a function criteria.

7. The method of claim 4 further comprising organizing the plurality of customer price list portfolios to generate a plurality of account manager portfolios.

8. The method of claim 7 further comprising organizing the plurality of account manager portfolios to generate at least one sales manager portfolio.

9. The method of claim 7 wherein the plurality of account manager portfolios within the at least one sales manager portfolio are grouped according to a desired account manager portfolio criteria.

10. The method of claim 9 wherein the desired account manager portfolio criteria includes one of an individual-name criteria, a group-of-individual-names criteria, and an approval criteria.

11. The system of claim 1 wherein the at least one collection of at least one hierarchically organized portfolio includes a plurality of customer price list portfolios.

12. The system of claim 11 wherein each of the plurality of customer price list portfolios includes a plurality of customer price list items which are organized according to a desired price list criteria.

13. The system of claim 12 wherein the desired price list criteria includes one of a cost criteria, a type criteria, a distributor criteria, a region criteria and a function criteria.

14. The system of claim 11 further comprising organizing the plurality of customer price list portfolios to generate a plurality of account manager portfolios.

15. The system of claim 14 further comprising organizing the plurality of account manager portfolios to generate at least one sales manager portfolio.

16. The system of claim 14 wherein the plurality of account manager portfolios within the at least one sales manager portfolio are grouped according to a desired account manager portfolio criteria.

17. The system of claim 16 wherein the desired account manager portfolio criteria includes one of an individual-name criteria, a group-of-individual-names criteria, and an approval criteria.

18. The method of claim 1, wherein the at least one hierarchically organized portfolio is organized by approval criteria whereby the at least one selection from the previous hierarchical level includes common approval criteria in order to facilitate the business policy.

19. The method of claim 18, wherein the approval criteria is the level of approval required by an enterprise selling the plurality of items within the collection of transactions.

20. The method of claim 1, wherein the variance from the business policy differs for each authority level.

* * * * *